(12) United States Patent
Wang et al.

(10) Patent No.: US 12,315,960 B2
(45) Date of Patent: May 27, 2025

(54) CURRENT COLLECTING MEMBER AND MANUFACTURING METHOD THEREOF, SECONDARY BATTERY AND MANUFACTURING METHOD THEREOF, BATTERY MODULE, AND APPARATUS

(71) Applicant: CONTEMPORARY AMPEREX TECHNOLOGY (HONG KONG) LIMITED, Hong Kong (CN)

(72) Inventors: Liangyi Wang, Fujian (CN); Runyong He, Fujian (CN); Feng Qin, Fujian (CN); Hua Zhang, Fujian (CN); Liangmei Chen, Fujian (CN); Zhi Wang, Fujian (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 764 days.

(21) Appl. No.: 17/530,759

(22) Filed: Nov. 19, 2021

(65) Prior Publication Data

US 2022/0085465 A1 Mar. 17, 2022

Related U.S. Application Data

(63) Continuation of application No. PCT/CN2019/122647, filed on Dec. 3, 2019.

(51) Int. Cl.
*H01M 50/557* (2021.01)
*H01M 50/103* (2021.01)
(Continued)

(52) U.S. Cl.
CPC ....... *H01M 50/557* (2021.01); *H01M 50/103* (2021.01); *H01M 50/166* (2021.01);
(Continued)

(58) Field of Classification Search
CPC .................................................. H01M 50/557
See application file for complete search history.

(56) References Cited

U.S. PATENT DOCUMENTS

| 3,856,575 | A | 12/1974 | Hughes |
| 9,214,653 | B2 | 12/2015 | Sato |

(Continued)

FOREIGN PATENT DOCUMENTS

| CN | 103123960 A | 5/2013 |
| CN | 103262293 A | 8/2013 |

(Continued)

OTHER PUBLICATIONS

Office Action dated Jan. 27, 2023 received in European Patent Application No. EP 19954959.3.

(Continued)

*Primary Examiner* — Karie O'Neill Apicella
(74) *Attorney, Agent, or Firm* — Scully, Scott, Murphy & Presser, P.C.

(57) ABSTRACT

The present application provides a current collecting member and a manufacturing method thereof, a secondary battery and a manufacturing method thereof, a battery module, and an apparatus. In the current collecting member of the secondary battery, a terminal connection part is perpendicular to a height direction. a transition part is connected to the terminal connection part and is bent to a side of the terminal connection part along a height direction, a connection between the transition part and the terminal connection part extends along a direction which is inclined relative to a length direction and a width direction. The tab connection part is connected to the transition part and is bent relative to the transition part, and a connection between the transition part and the tab connection part is parallel to the length (Continued)

direction. The tab connection part is at least partially perpendicular to the width direction.

20 Claims, 11 Drawing Sheets

(51) Int. Cl.
  *H01M 50/166* (2021.01)
  *H01M 50/533* (2021.01)
  *H01M 50/564* (2021.01)

(52) U.S. Cl.
  CPC ....... *H01M 50/533* (2021.01); *H01M 50/564* (2021.01); *H01M 2220/20* (2013.01)

(56) References Cited

U.S. PATENT DOCUMENTS

| | | | |
|---|---|---|---|
| 2010/0323239 | A1 | 12/2010 | Kim |
| 2013/0130104 | A1 | 5/2013 | Masuda et al. |
| 2013/0260190 | A1 | 10/2013 | Sato |
| 2014/0023913 | A1 | 1/2014 | Yokoyama et al. |
| 2015/0380712 | A1* | 12/2015 | Tsunaki ............ H01M 50/566 429/121 |
| 2017/0324125 | A1 | 11/2017 | Schoenherr et al. |
| 2019/0067665 | A1 | 2/2019 | Jang |

FOREIGN PATENT DOCUMENTS

| | | |
|---|---|---|
| CN | 207068966 U | 3/2018 |
| CN | 207801088 U | 8/2018 |
| CN | 208014793 U | 10/2018 |
| CN | 208507745 U | 2/2019 |
| CN | 209675387 U | 11/2019 |
| DE | 112018008104 T5 | 8/2021 |
| JP | 2012123946 A | 6/2012 |
| JP | 2012182043 A | 9/2012 |
| JP | 2013127948 A | 6/2013 |
| JP | 2017120743 A | 7/2017 |
| JP | 2018101568 A | 6/2018 |
| KR | 20140124247 A | 10/2014 |
| KR | 20180076146 A | 7/2018 |
| WO | 2012077216 A1 | 6/2012 |

OTHER PUBLICATIONS

International Search Report dated Sep. 3, 2020 issued in PCT/CN2019/122647.
Office Action dated Aug. 18, 2022 received in European Patent Application No. EP 19954959.3.
International Search Report and Written Opinion dated Sep. 3, 2020 received in International Application No. PCT/CN2019/122647.
Extended European Search report dated Mar. 24, 2022 received in European Patent Application No. EP 19954959.3.
First Notice of Review Observations dated Jun. 3, 2023 received in Chinese Patent Application No. 201980098700.X.
Decision to Grant a Patent dated Dec. 11, 2023 received in Japanese Patent Application No. JP 2022-533192.
Notification of Registration and Grant of Patent for Invention dated Dec. 26, 2023 received in Chinese Patent Application No. CN 201980098700.X.

* cited by examiner

CURRENT COLLECTING MEMBER AND MANUFACTURING METHOD THEREOF, SECONDARY BATTERY AND MANUFACTURING METHOD THEREOF, BATTERY MODULE, AND APPARATUS

CROSS-REFERENCE TO RELATED APPLICATIONS

The present application is a continuation of International Application No. PCT/CN2019/122647, filed on Dec. 3, 2019, the disclosure of which is hereby incorporated by reference in its entirety.

TECHNICAL FIELD

The present application relates to the field of batteries, in particular, to a current collecting member and a manufacturing method thereof, a secondary battery and a manufacturing method thereof, a battery module, and an apparatus.

BACKGROUND

Secondary batteries such as lithium-ion batteries are widely used in electronic apparatuses such as mobile phones and notebook computers due to their high energy densities and environmental friendliness. In recent years, to cope with environmental issues, gasoline price issues, and energy storage issues, application of lithium-ion batteries has been rapidly expanded to gasoline-electric hybrid vehicles, steamships, and energy storage systems.

A secondary battery includes a housing, an electrode assembly, electrode terminals, and a current collecting member. The electrode assembly is accommodated in the housing, and the current collecting member connects the electrode terminals and the electrode assembly.

SUMMARY

In view of the issues in the background, a purpose of the present application is to provide a current collecting member and a manufacturing method thereof, a secondary battery and a manufacturing method thereof, a battery module, and an apparatus, so as to connect an electrode terminal and an electrode assembly, reduce assembling difficulty of a current collecting member and an electrode assembly, and improve a flow capacity.

To achieve the foregoing purpose, the present application provides a current collecting member of a secondary battery. The current collecting member of the secondary battery includes a terminal connection part, a transition part, and a tab connection part. The terminal connection part is perpendicular to a height direction. The transition part is connected to the terminal connection part and is bent to a side of the terminal connection part along the height direction, a connection between the transition part and the terminal connection part extends along a first direction, and the first direction is inclined relative to a length direction and a width direction. The tab connection part is connected to the transition part and is bent relative to the transition part, and a connection between the transition part and the tab connection part is parallel to the length direction. The tab connection part is at least partially perpendicular to the width direction. Along the height direction, the tab connection part is located on a side of the transition part away from the terminal connection part.

In some embodiments, in the width direction, a first edge and a second edge are oppositely arranged on two ends of the terminal connection part. In a plane perpendicular to the height direction, along the width direction, a projection of the tab connection part is at least partially located between a projection of the first edge and a projection of the second edge.

In some embodiments, the transition part includes a first bending part, an adapting part, and a second bending part, where the adapting part is located on a lower side of the terminal connection part along the height direction, the first bending part is connected between the terminal connection part and the adapting part and is parallel to the first direction, and the second bending part is connected between the tab connection part and the adapting part and is parallel to the length direction. In a plane perpendicular to the height direction, along the width direction, a projection of the second bending part is at least partially located between a projection of the first edge and a projection of the second edge.

In some embodiments, the adapting part is parallel to the terminal connection part.

In some embodiments, the current collecting member has a first notch, the first notch has a first sub-notch and a second sub-notch, and the first sub-notch and the second sub-notch are communicated with each other. The first sub-notch is located on a side of the first bending part close to the tab connection part along the first direction, an included angle between the first direction and the width direction is $\alpha$, a dimension of the terminal connection part along the width direction is L, and a dimension of the first bending part along the first direction is less than $L/\cos \alpha$. The second sub-notch is located on a side of the second bending part along the length direction. Along the length direction, a dimension of the tab connection part is larger than a dimension of the second bending part.

In some embodiments, the included angle between the first direction and the width direction is 40 degrees to 50 degrees.

In some embodiments, the current collecting member further has a second notch, and the second notch is at least partially located on a side of the first bending part away from the tab connection part along the first direction.

In some embodiments, a maximum dimension of the terminal connection part in the width direction is a maximum dimension of the current collecting member in the width direction.

In some embodiments, the dimension of the terminal connection part along the width direction is equal to the dimension of the tab connection part along the length direction.

To achieve the foregoing purpose, the present application provides a secondary battery. The secondary battery includes a top cover assembly, an electrode assembly, a housing, and the aforementioned current collecting member. The electrode assembly is accommodated in the housing. The electrode assembly includes a base part and a tab, and the tab extends from an end of the base part in the length direction. The top cover assembly includes a top cover plate and an electrode terminal, where the top cover plate is connected to the housing, and the electrode terminal is disposed on the top cover plate. The terminal connection part of the current collecting member is connected to the electrode terminal, and the tab connection part of the current collecting member is connected to the tab.

In some embodiments, the tab is arranged on a side of the tab connection part along the width direction. The tab connection part includes a first part and a second part, where the first part is perpendicular to the width direction, the second part is connected between the first part and the transition part, and the second part is inclined relative to the first part toward a direction away from the tab. In a plane perpendicular to the height direction, a projection of the first part at least partially overlaps a projection of the transition part. The tab includes a fixing part and a convex part, where the fixing part is connected to the first part, and the convex part is connected to the fixing part and is located on a side of the fixing part close to the transition part. Along the width direction, a dimension of the convex part is larger than a dimension of the fixing part; and in the height direction, a portion of the convex part is located between the second part and the transition part.

In some embodiments, the tab connection part includes a third part connected between the second part and the transition part, and the third part is perpendicular to the width direction. In a plane perpendicular to the width direction, a projection of the third part at least partially overlaps a projection of the convex part.

In some embodiments, the terminal connection part has a first through hole and a second through hole, where the first through hole and the second through hole are arranged along the length direction. The electrode terminal passes through the first through hole. The top cover assembly further includes a lower insulator, where the lower insulator is arranged on the top cover plate and separates the top cover plate from the current collecting member. The lower insulator has a protrusion, where the protrusion is inserted into the second through hole.

To achieve the foregoing purpose, the present application further provides a battery module, where the battery module includes the aforementioned secondary battery, and there are a plurality of secondary batteries.

To achieve the foregoing purpose, the present application further provides an apparatus, where the apparatus includes a main body and the aforementioned secondary battery, and there are a plurality of secondary batteries disposed in the main body.

To achieve the foregoing purpose, the present application further provides a method for manufacturing a current collecting member, including: providing a metal plate, where the metal plate includes a first long side and a second long side that are disposed opposite to each other in a width direction; opening a first notch on the first long side of the metal plate; bending the metal plate in a region in which the first notch is opened, and forming a terminal connection part, a flat plate part partially overlapping the terminal connection part along the height direction, and a first bending part connecting the terminal connection part and the flat plate part, where the first bending part extends in a first direction inclined relative to the length direction and the width direction; after bending the metal plate, forming, at the first notch, at least a first sub-notch and a second sub-notch that are communicated each other, where the first sub-notch is opened on a side of the first bending part along the first direction, and at least a portion of the second sub-notch is opened on a side of the flat plate part along the length direction; and bending the flat plate part along the height direction in a region in which the second sub-notch is opened, and after the bending, forming an adapting part that is located on a lower side of the terminal connection part along the height direction, an tab connection part perpendicular to the adapting part, and a second bending part that is connected between the adapting part and the tab connection part and that is parallel to the length direction.

In some embodiments, the method for manufacturing a current collecting member further includes: opening a second notch on the second long side of the metal plate, where the first notch and the second notch are located on two sides of the metal plate along the width direction respectively. After the first notch and the second notch are opened, the metal plate is bent in the region in which the first notch is opened. After the metal plate is bent and the first bending part is formed, the second notch is at least partially located on a side of the first bending part away from the tab connection part along the first direction.

In some embodiments, the method for manufacturing a current collecting member further includes: after the tab connection part is formed, bending the tab connection part to form a first part perpendicular to the adapting part, a third part that is parallel to the first part and that is connected to the second bending part, and a second part that connects the first part and the third part and that is inclined relative to the first part.

To achieve the foregoing purpose, the present application further provides a method for manufacturing a secondary battery, including: providing a current collecting member manufactured according to the aforementioned method for manufacturing a current collecting member; connecting a terminal connection part of the current collecting member to an electrode terminal of a top cover assembly, and connecting a tab connection part of the current collecting member to a tab of the electrode assembly; and placing the electrode assembly into a housing, and connecting a top cover plate of the top cover assembly to the housing in a sealed manner.

Beneficial effects of the present application are as follows: The current collecting member provided in this application can connect the electrode terminal and the electrode assembly, to implement charging and discharging of the secondary battery. A bending structure of the current collecting member of this application can make at least a portion of the tab connection part perpendicular to the width direction, and the tab can be directly attached to the portion of the tab connection part perpendicular to the width direction without bending, thereby reducing assembly difficulty. In addition, the tab can be laminated on the tab connection part, to increase a connection area between the tab and the tab connection part, enhance connection strength between the tab connection part and the tab, and improve a flow capacity.

DESCRIPTION OF REFERENCE SIGNS

| | |
|---|---|
| 1. current collecting member; | 2. electrode assembly; |
| 11. terminal connection part; | 21. base part; |
| 111. first edge; | 22. tab; |
| 112. second edge; | 221. fixing part; |
| 113: first through hole; | 222. convex part; |
| 114: second through hole; | 3. housing; |
| 12. transition part; | 4. top cover assembly; |
| 121. first bending part; | 41. top cover plate; |
| 122. adapting part; | 42. electrode terminal; |
| 123. second bending part; | 43. lower insulator; |
| 13. tab connection part; | 431. protrusion; |
| 131. first part; | 1000. secondary battery; |
| 132. second part; | D. first direction; |
| 133. third part; | X. length direction; |
| 14. first notch; | Y. width direction; |
| 141. first sub-notch; | Z. height direction; |
| 142. second sub-notch; and | |
| 15. second notch. | |

DESCRIPTION OF EMBODIMENTS

To make the objectives, technical solutions, and advantages of this application more comprehensible, the following describes this application in detail with reference to embodiments and accompanying drawings. It should be understood that the specific embodiments described herein are merely used to explain this application but are not intended to limit this application.

In the descriptions of this application, unless otherwise specified and defined explicitly, the terms "first", "second", and "third" are merely intended for a purpose of description, and should not be understood as any indication or implication of relative importance; the term "plurality of" indicates two or more (including two); and unless otherwise specified and defined explicitly, the term "connection" should be understood in its general senses. For example, the "connection" may be a fixed connection, a detachable connection, an integrated connection, or an electrical connection, or a signal connection; or may be a direct connection, or an indirect connection through an intermediate medium. A person of ordinary skill in the art can understand specific meanings of these terms in this application based on specific situations.

In the descriptions of this application, the "perpendicular" not only includes absolute perpendicularity, but also includes the conventionally recognized perpendicularity in engineering, and therefore an error is allowed. The "parallel" not only includes absolute parallelism, but also includes the conventionally recognized parallelism in engineering, and therefore an error is allowed. It should be understood that the directional terms such as "up" and "down" described in the embodiments of this application are described as seen from the angles shown in the accompanying drawings, and should not be understood as a limitation to the embodiments of this application. This application is hereinafter further described in detail with reference to specific embodiments and accompanying drawings.

Figure 1:
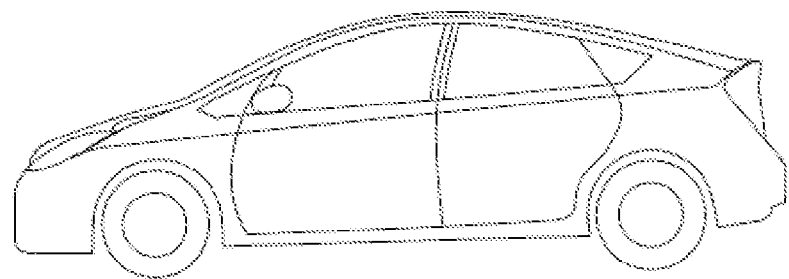
FIG. 1 is a schematic diagram of an apparatus that uses a secondary battery as a power supply.

This application provides an apparatus that uses a secondary battery as a power supply. The apparatus includes a main body and a secondary battery 1000, where there are a plurality of secondary batteries 1000 disposed in the main body. Referring to FIG. 1, the apparatus may be a steamship, a vehicle, or the like. The vehicle is a new energy vehicle, which may be a battery electric vehicle, or may be a hybrid electric vehicle or an extended-range electric vehicle. The main body of the vehicle is provided with a drive motor. The drive motor is electrically connected to the secondary battery 1000, and is provided with electrical energy by the secondary battery 1000. The drive motor is connected to wheels on the main body of the vehicle through a transmission mechanism to drive the vehicle. In some embodiments, the secondary battery 1000 is a lithium-ion battery.

Figure 2:
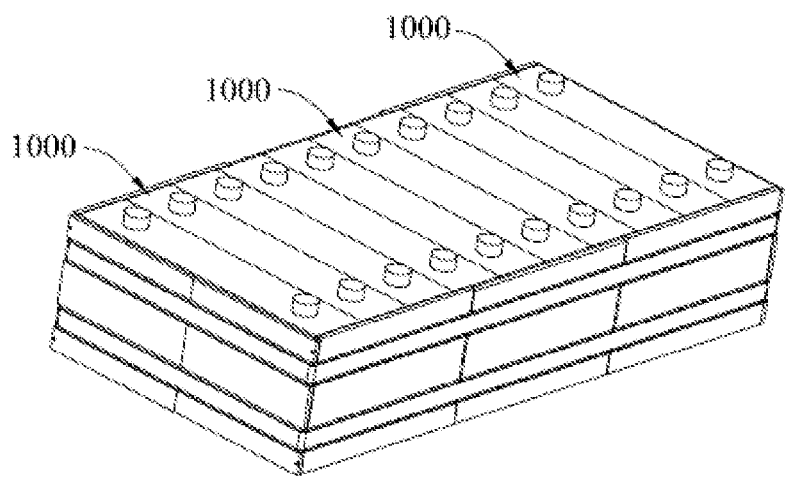
FIG. 2 is a schematic diagram of a battery module.

This application further provides a battery module. Referring to FIG. 2, the battery module includes a plurality of secondary batteries 1000, where the plurality of secondary batteries 1000 are arranged in sequence. The battery module may further include a support frame, where the support frame accommodates and fixes the plurality of secondary batteries 1000.

Figure 3:
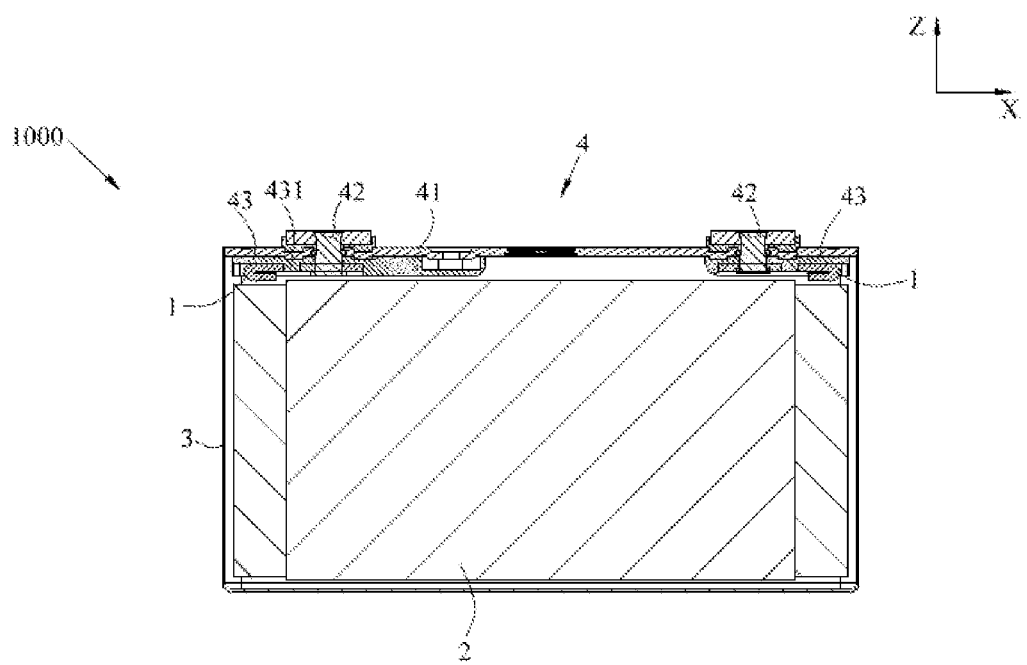
FIG. 3 is a cross-sectional view of a secondary battery.
Figure 4:
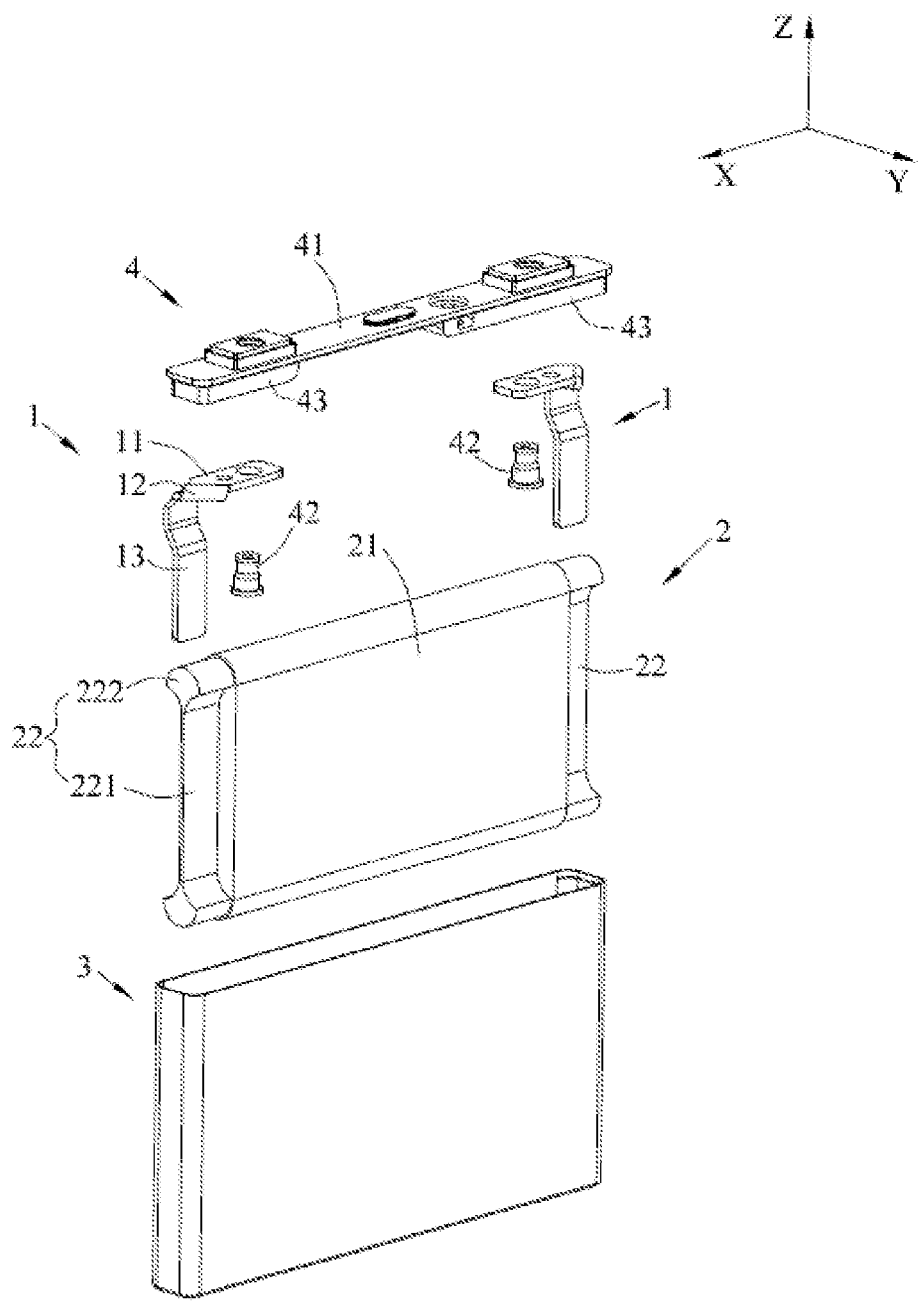
FIG. 4 is an exploded view of a secondary battery.

Referring to FIG. 3 and FIG. 4, the secondary battery includes a current collecting member 1, an electrode assembly 2, a housing 3, and a top cover assembly 4.

The electrode assembly 2 is a core member of the secondary battery for implementing a charging and discharging function. The electrode assembly 2 includes a positive electrode plate, a negative electrode plate, and a separator, where the separator separates the positive electrode plate and the negative electrode plate.

The electrode assembly 2 may be of a wound structure. Specifically, quantities of both the positive electrode plate and the negative electrode plate are one, and the positive electrode plate and the negative electrode plate are of a strip structure. The positive electrode plate, the separator, and the negative electrode plate are sequentially stacked and wound by two or more turns to form the electrode assembly 2. In preparation of the electrode assembly 2, the electrode assembly 2 may be first wound to form a hollow cylindrical structure. After the winding, the electrode assembly 2 is leveled to a plate shape.

Alternatively, the electrode assembly 2 may alternatively be of a laminated structure. Specifically, there are a plurality of the positive electrode plates and a plurality of the negative electrode plates. The plurality of positive electrode plates and the negative electrode plates are alternately stacked, and the separator separates the positive electrode plates and the negative electrode plates.

The positive electrode plate includes a positive electrode current collector and a positive active material layer coated on a surface of the positive electrode current collector. The positive electrode current collector may be an aluminum foil, and the positive active material layer includes a ternary material, lithium manganate, or lithium iron phosphate. The positive electrode current collector includes a positive electrode coating region and a positive electrode blank region, where a surface of the positive electrode coating region is coated with the positive active material layer, and a surface of the positive electrode blank region is not coated with the positive active material layer.

The negative electrode plate includes a negative electrode current collector and a negative active material layer coated on a surface of the negative electrode current collector. The negative electrode current collector may be a copper foil, and the negative active material layer includes graphite or silicon. The negative electrode current collector includes a negative electrode coating region and a negative electrode blank region, where a surface of the negative electrode coating region is coated with the negative active material layer, and a surface of the negative electrode blank region is not coated with the negative active material layer.

From an appearance of the electrode assembly 2, referring to FIG. 4, the electrode assembly 2 includes a base part 21 and a tab 22 and the tab 22 extends from an end of the base part 21 in a length direction X. There may be two tabs 22 extending from two ends of the base part 21 in the length direction X, respectively. The two tabs 22 are a positive electrode tab and a negative electrode tab. The base part 21 includes the separator, the positive electrode coating region, and the negative electrode coating region. The positive electrode tab includes the positive electrode blank region, and the negative electrode tab includes the negative electrode blank region.

Figure 6:
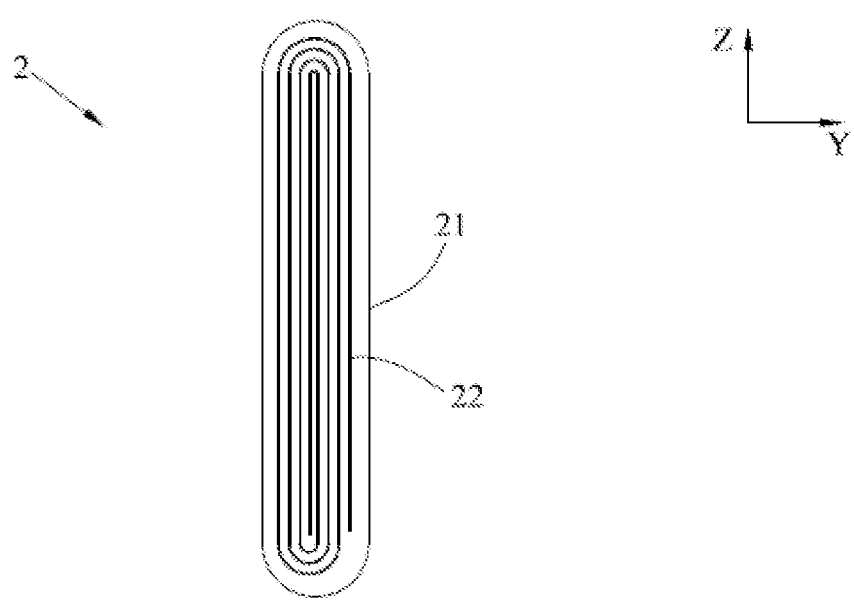
FIG. 6 is a schematic diagram of an electrode assembly of a secondary battery before the electrode assembly is assembled with a current collecting member.

Referring to FIG. 6, the tab 22 has a multilayer structure. Specifically, each tab 22 includes a plurality of tab layers stacked in a width direction Y.

The housing 3 may have a hexahedral shape or other shapes. An accommodating cavity is formed inside the housing 3 to accommodate the electrode assembly 2 and electrolyte. An end of the housing 3 along a height direction Z forms an opening, and the electrode assembly 2 can be placed into the accommodating cavity of the housing 3 through the opening. The housing 3 may be made of a conductive metal material, and in some embodiments, the housing 3 is made of aluminum or aluminum alloy.

The top cover assembly 4 includes a top cover plate 41 and an electrode terminal 42, where the top cover plate 41 is connected to the housing 3, and the electrode terminal 42 is disposed on the top cover plate 41. A shape of the top cover plate 41 matches that of the opening of the housing 3, and the top cover plate 41 may be connected to the housing 3 through welding or the like to cover the opening of the housing 3, thereby implementing sealing of the housing 3. There are two electrode terminals 42, namely, a positive electrode terminal and a negative electrode terminal. The positive electrode terminal is electrically connected to the positive electrode tab, and the negative electrode terminal is electrically connected to the negative electrode tab.

There are two current collecting members 1, one is connected to the positive electrode terminal and the positive electrode tab, and the other is connected to the negative electrode terminal and the negative electrode tab.

The following describes the current collecting member of this application in detail.

Referring to FIG. 4 to FIG. 10, a current collecting member 1 of this application includes a terminal connection part 11, a transition part 12, and a tab connection part 13.

The terminal connection part 11 is perpendicular to a height direction Z. The terminal connection part 11 may be connected to the electrode terminal 42 through welding, riveting, or the like. In some embodiments, the terminal connection part 11 is plate-shaped, that is, in the height direction Z, the terminal connection part 11 has a uniform thickness.

The transition part 12 is connected to the terminal connection part 11 and is bent to a side of the terminal connection part 11 along the height direction Z. In this application, the transition part 12 is bent to the side of the terminal connection part 11 away from a top cover assembly 4 along the height direction Z. A connection between the transition part 12 and the terminal connection part 11 extends along a first direction D, and the first direction D is inclined relative to a length direction X and a width direction Y.

In this application, a dimension of the secondary battery along the length direction X is larger than a dimension of the secondary battery along the width direction Y.

The tab connection part 13 is connected to the transition part 12 and is bent relative to the transition part 12, and a connection between the transition part 12 and the tab connection part 13 is parallel to the length direction X. Along the height direction Y, the tab connection part 13 is located on a side of the transition part 12 away from the terminal connection part 11. The tab connection part 13 may be connected to a tab 22 through welding or the like.

The tab connection part 13 is at least partially perpendicular to the width direction Y. In some embodiments, the tab connection part 13 is plate-shaped and is parallel to the length direction X.

Figure 11:
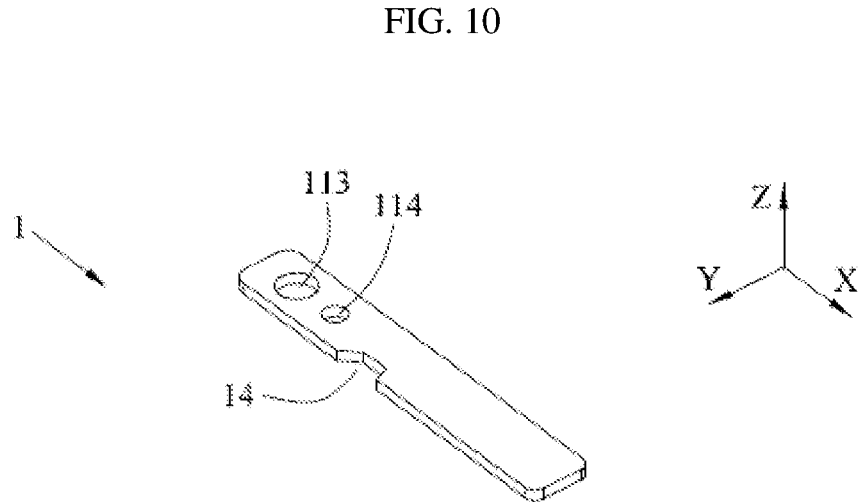
FIG. 11 is a schematic diagram of a plate used to form the current collecting member in FIG. 8.

The current collecting member 1 of this application can be formed by bending a metal plate. In some embodiments, the current collecting member 1 can be formed based on the following steps:

Referring to FIG. 11, a strip-shaped metal plate is provided, where a dimension of the metal plate along the length direction X is larger than a dimension of the metal plate along the width direction Y.

The metal plate is bent to form a terminal connection part 11 and a flat plate part, where the flat plate part partially overlaps the terminal connection part 11 in the height direction Z, where a bending part of the metal plate is inclined relative to the length direction X and the width direction Y.

The flat plate part is bent downward along the height direction Z, and the transition part 12 and the tab connection part 13 are formed after the bending. The tab connection part 13 is perpendicular to the terminal connection part 11, the transition part 12 is connected between the terminal connection part 11 and tab connection part 13, and a connection between the transition part 12 and the tab connection part 13 is parallel to the length direction X.

Before the electrode assembly 2 and the current collecting member 1 are assembled, the tab 22 is substantially parallel to the length direction X. If the tab connection part 13 is perpendicular to the length direction X, when the electrode assembly 2 and the current collecting member 1 are assembled, only the tab 22 can be bent, or an end of the tab 22 away from a base part 21 is connected to the tab connection part 13. Bending the tab 22 increases processes and reduces assembly efficiency. In addition, the tab 22 is a metal foil, and therefore a thickness of each tab layer of the tab 22 is small. Connecting an end of each tab layer to the tab connection part 13 results in low connection strength and a small flow area.

However, a bending structure of the current collecting member 1 of this application can make at least a portion of the tab connection part 13 perpendicular to the width direction Y, and the tab 22 can be directly attached to the portion of the tab connection part 13 perpendicular to the width direction Y without bending, thereby reducing assembly difficulty. In addition, a plurality of tab layers of the tab 22 can be laminated on the tab connection part 13, to increase a connection area between each tab layer and the tab connection part 13, enhance connection strength between the tab connection part 13 and the tab 22, and improve a flow capacity.

Figure 9:
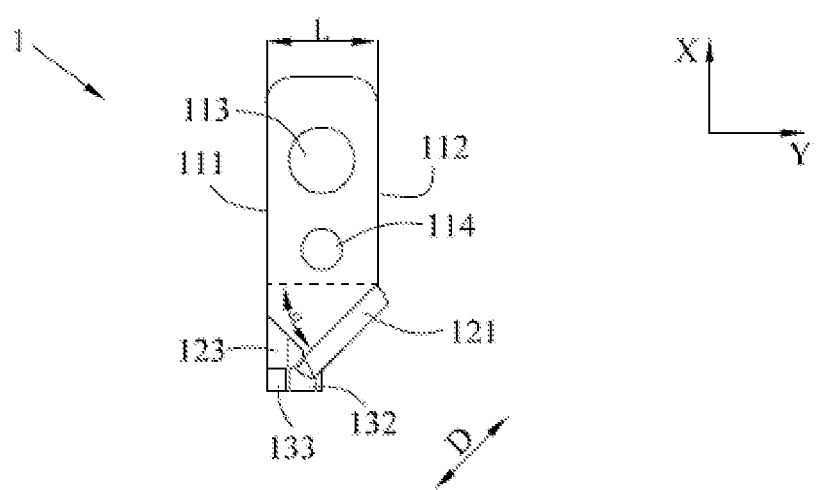
FIG. 9 is a vertical view of the current collecting member in FIG. 8.

In some embodiments, referring to FIG. 9, in the width direction Y, a first edge 111 and a second edge 112 are oppositely arranged on two ends of the terminal connection part 11. The first edge 111 and the second edge 112 are parallel to the length direction X. In a plane perpendicular to the height direction Z, along the width direction Y, a projection of the tab connection part 13 is at least partially located between a projection of the first edge 111 and a projection of the second edge 112. This can reduce an additional space occupied by the tab connection part 13 in the width direction Y, reduce a maximum dimension of the current collecting member 1 in the width direction Y, reduce a space occupied by the current collecting member 1 in the housing 3, and improve an energy density of the secondary battery.

Figure 8:
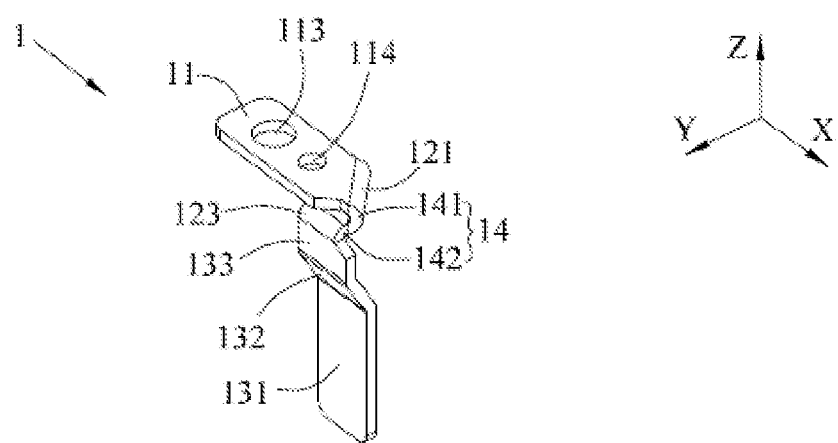
FIG. 8 is a schematic diagram of an embodiment of a current collecting member of a secondary battery.
Figure 10:
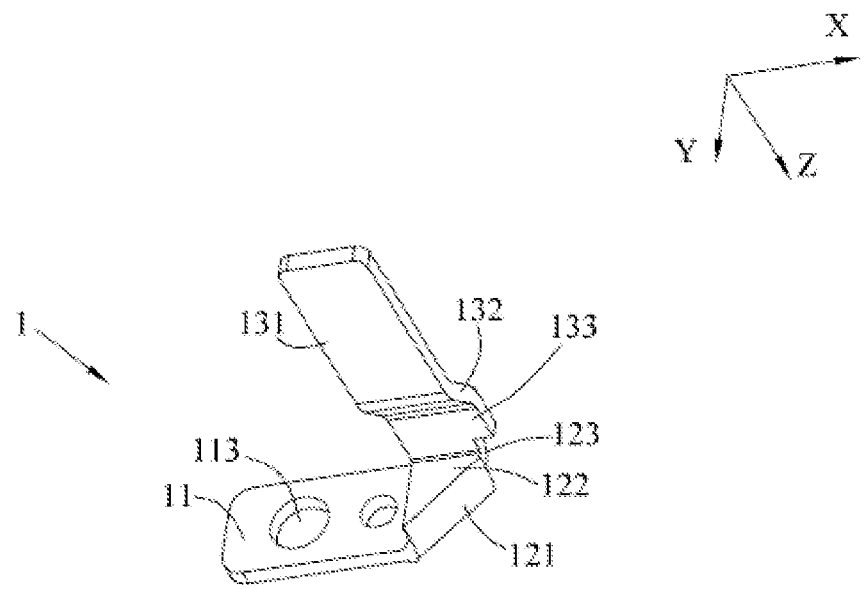
FIG. 10 is another schematic diagram of the current collecting member in FIG. 8.

In some embodiments, referring to FIG. 8 to FIG. 10, the transition part 12 includes a first bending part 121, an adapting part 122, and a second bending part 123, where the adapting part 122 is located on a lower side of the terminal connection part 11 along the height direction Z, the first bending part 121 is connected between the terminal connection part 11 and the adapting part 122 and is parallel to the first direction D, and the second bending part 123 is connected between the tab connection part 13 and the adapting part 122 and is parallel to the length direction X. The first bending part 121 and the second bending part 123 are respectively formed in two bending processes of the current collecting member 1, and an outer surface of the first bending part 121 and an outer surface of the second bending part 123 are generally arc.

In a plane perpendicular to the height direction Z, along the width direction Y, a projection of the second bending part 123 is at least partially located between the projection of the first edge 111 and the projection of the second edge 112. This can reduce an additional space occupied by the transition part 12 in the width direction Y, reduce a maximum dimension of the current collecting member 1 in the width direction Y, reduce a space occupied by the current collecting member 1 in the housing 3, and improve an energy density of the secondary battery.

The adapting part 122 is located on an inner side the second bending part 123 in the width direction Y. In a plane perpendicular to the height direction Z, along the width direction Y, the adapting part 122 is located between the projection of the first edge 111 and the projection of the second edge 112. In other words, the adapting part 122 does not occupy an additional space in the width direction Y.

In some embodiments, the adapting part 122 is parallel to the terminal connection part 11. In this way, a gap between the adapting part 122 and the terminal connection part 11 can be reduced, and the dimension of the current collecting member 1 in the height direction Z can be reduced. In some embodiments, the adapting part 122 contacts the terminal connection part 11; during charging and discharging, a current can be directly transmitted to the terminal connection part 11 through the adapting part 122, thereby increasing the flow area between the transition part 12 and the terminal connection part 121, and improving a flow capacity of the current collecting member 1.

In some embodiments, referring to FIG. 8 to FIG. 10, the current collecting member 1 has a first notch 14. The first notch 14 has a first sub-notch 141 and a second sub-notch 142, and the first sub-notch 141 and the second sub-notch 142 are communicated with each other.

The first sub-notch 141 is located on a side of the first bending part 121 close to the tab connection part 13 along the first direction D, an included angle between the first direction D and the width direction Y is a, a dimension of the terminal connection part 11 along the width direction Y is L, and a dimension of the first bending part 121 along the first direction D is less than L/cos a. By opening the first sub-notch 141, the dimension of the first bending part 121 along the first direction D can be reduced, so that an end of the first bending part 121 close to the tab connection part 13 in the first direction D tapers inwards. The end of the first bending part 121 close to the tab connection part 13 in the first direction D directly affects a position of the second bending part 123 in the width direction Y. When the first bending part 121 tapers inwards along the first direction D near an end of the tab connection part 13, the space occupied by the second bending part 123 and the tab connection part 13 in the width direction Y can be reduced.

In some embodiments, the first bending part 121 and the tab connection part 13 do not occupy an additional space in the width direction Y. In other words, in a plane perpendicular to the height direction Z, along the width direction Y, neither a projection of the second bending part 123 nor a projection of tab connection part 13 goes beyond the projection of the first edge 111 or the projection of the second edge 112.

The second sub-notch 142 is located on a side of the second bending part 123 along the length direction X. Along the length direction X, a dimension of the tab connection part 13 is larger than a dimension of the second bending part 123. By opening the second sub-notch 142, the dimension of the second bending part 123 can be reduced, bending difficulty of the second bending part 123 can be reduced, and the second bending part 123 is prevented from interfering with the first bending part 121 in a bending process.

The included angle α between the first direction D and the width direction Y is 40 degrees to 50 degrees. In some embodiments, the included angle α between the first direction D and the width direction Y is 45 degrees. In this way, referring to FIG. 13, when the current collecting member 1 is bent and formed, the tab connection part 13 can be substantially parallel to the height direction Z, avoiding the tab connection part 13 being inclined relative to the height direction Z, and reducing the space occupied by the tab connection part 13. Certainly, due to a process error, the included angle α between the first direction D and the width direction Y is 45±5 degrees.

The following briefly describes a method for manufacturing a current collecting member 1 in other embodiments. Specifically, the manufacturing method includes the following steps.

Referring to FIG. 11, a metal plate is provided, where a dimension of the metal plate along a length direction X is larger than a dimension of the metal plate in a width direction Y, and the metal plate includes a first long side and a second long side that are oppositely arranged in the width direction Y.

A first notch 14 is opened on the first long side of the metal plate. The first notch 14 may be formed by punching or the like, and the first notch 14 may be rectangular, trapezoidal, triangular, semicircular, or the like.

Figure 12:
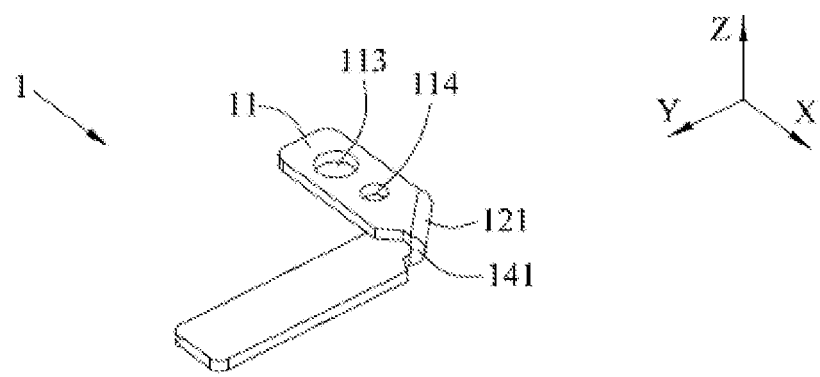
FIG. 12 is a schematic diagram of the plate in FIG. 11 after first bending.

Referring to FIG. 12, the metal plate is bent in a region in which the first notch 14 is opened, and a terminal connection part 11, a flat plate part, and a first bending part 121 are formed, where the flat plate part partially overlaps the terminal connection part 11 in a height direction Z, the first bending part 121 connects the terminal connection part 11 and the flat plate part, and the first bending part 121 extends along a first direction D inclined relative to the length direction X and the width direction Y.

After the metal plate is bent, a first sub-notch 141 and a second sub-notch 142 that are communicated with each other are formed at the first notch 14. The first sub-notch 141 is opened on the first bending part 121. To be specific, the first sub-notch 141 is opened on a side of the first bending part 121 along the first direction D. The second sub-notch 142 is opened on the flat plate part. To be specific, the second sub-notch 142 is located on a side of a partial region of the flat plate part along the length direction X.

In a region in which the second sub-notch 142 is opened, the flat plate part is bent along the height direction Z, and an adapting part 122, a tab connection part 13, and the second bending part 123 are formed after the bending. The adapting part 122 is located on a lower side of the terminal connection part 11 along the height direction Z, the tab connection part 13 is perpendicular to the adapting part 122, and the second bending part 123 is connected between the adapting part 122 and the tab connection part 13 and is parallel to the length direction X.

In this application, by opening the first notch 14, after the current collecting member 1 is bent and formed, the additional space occupied by the transition part 12 and the tab connection part 13 in the width direction Y can be reduced, the maximum dimension of the current collecting member 1 in the width direction Y can be reduced, and the space occupied by the current collecting member 1 in the housing 3 can be reduced.

Figure 14:
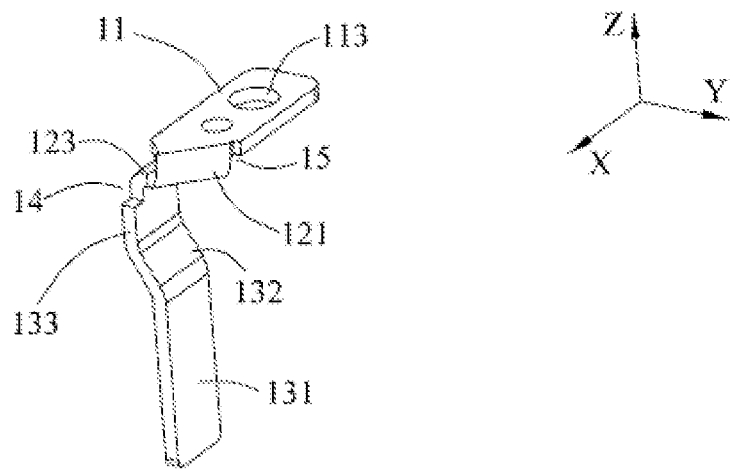
FIG. 14 is a schematic diagram of another embodiment of a current collecting member of a secondary battery.
Figure 15:
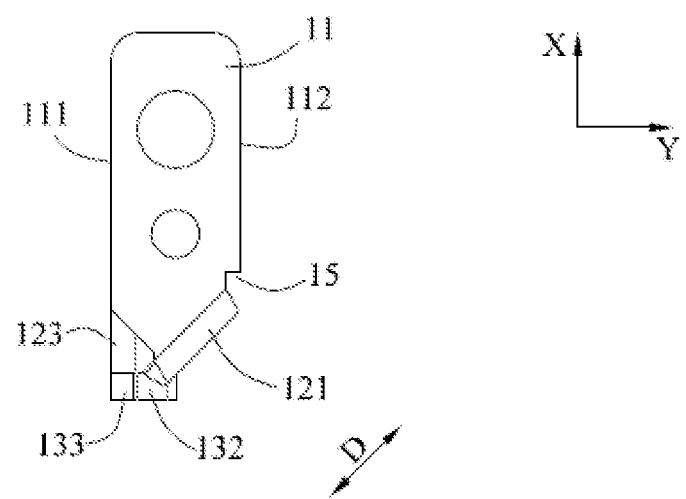
FIG. 15 is a vertical view of the current collecting member in FIG. 14.
Figure 16:
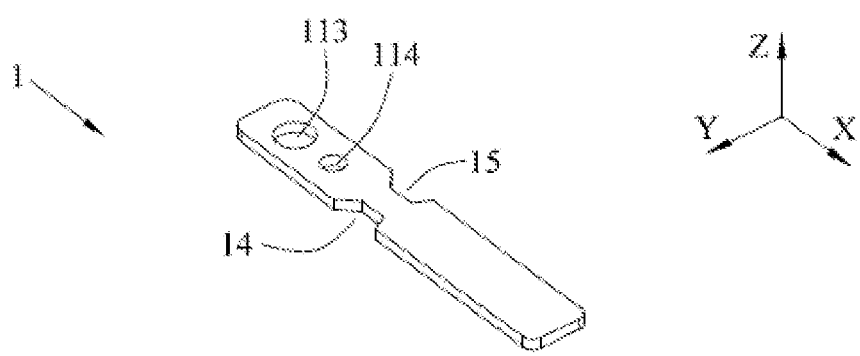
FIG. 16 is a schematic diagram of a plate used to form the current collecting member in FIG. 14.

In some embodiments, referring to FIG. 14 and FIG. 15, the current collecting member 1 further has a second notch 15, where the second notch 15 is at least partially located on a side of the first bending part 121 away from the tab connection part 13 along the first direction D.

By opening the second notch 15, the dimension of the first bending part 121 along the first direction D can be reduced, so that an end of the first bending part 121 away from the tab connection part 13 in the first direction D tapers inwards. When the end of the first bending part 121 away from the tab connection part 13 in the first direction D tapers inwards, the additional space occupied by the first bending part 121 in the width direction Y can be reduced.

A maximum dimension of the terminal connection part 11 in the width direction Y is a maximum dimension of the current collecting member 1 in the width direction Y. In other words, in a plane perpendicular to the height direction Z, along the width direction Y, neither a projection of the transition part 12 nor a projection of tab connection part 13 goes beyond the projection of the first edge 111 or the projection of the second edge 112. In this case, neither the transition part 12 nor the tab connection part 13 occupies the additional space in the width direction Y, thereby reducing the space occupied by the current collecting member 1 in the housing 3, and improving an energy density of the secondary battery.

The following briefly describes a method for manufacturing a current collecting member 1 in still other embodiments. Specifically, the manufacturing method includes the following steps.

Referring to FIG. 11, a metal plate is provided, where a dimension of the metal plate along a length direction X is larger than a dimension of the metal plate in a width direction Y, and the metal plate includes a first long side and a second long side that are oppositely arranged in the width direction Y.

A first notch 14 is opened on the first long side of the metal plate, and a second notch 15 is opened on the second long side of the metal plate. The first notch 14 and the second notch 15 may be formed in a same punching process, or may be formed in two punching processes, respectively.

Referring to FIG. 12, the metal plate is bent in a region in which the first notch 14 is opened, and a terminal connection part 11, a flat plate part, and a first bending part 121 are formed, where the flat plate part partially overlaps the terminal connection part 11 in a height direction Z, the first bending part 121 connects the terminal connection part 11 and the flat plate part, and the first bending part 121 extends along a first direction D inclined relative to the length direction X and the width direction Y.

After the metal plate is bent, a first sub-notch 141 and a second sub-notch 142 that are communicated with each other are formed at the first notch. The first sub-notch 141 is opened on the first bending part 121. To be specific, the first sub-notch 141 is opened on a side of the first bending part 121 along the first direction D. The second sub-notch 142 is opened on the flat plate part. To be specific, the second sub-notch 142 is located on a side of a partial region of the flat plate part along the length direction X. The second notch 15 is at least partially located on a side of the first bending part 121 away from the tab connection part 13 along the first direction D.

In a region in which the second sub-notch 142 is opened, the flat plate part is bent along the height direction Z, and an adapting part 122, a tab connection part 13, and the second bending part 123 are formed after the bending. The adapting part 122 is located on a lower side of the terminal connection part 11 along the height direction Z, the tab connection part 13 is perpendicular to the adapting part 122, and the second bending part 123 is connected between the adapting part 122 and the tab connection part 13 and is parallel to the length direction X.

A dimension of the terminal connection part 11 in the width direction Y is equal to a dimension of the tab connection part 13 in the length direction X. In this case, the current collecting member 1 of this application can be formed by a metal plate with equal widths through processes such as notch punching and bending.

Figure 5:
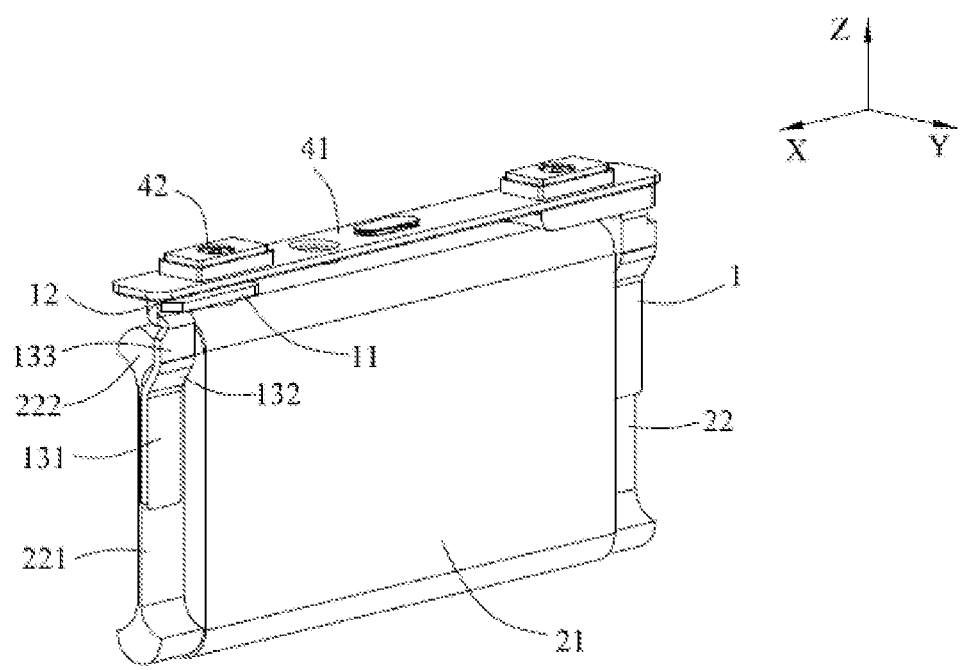
FIG. 5 is a schematic diagram of a secondary battery, in which a housing is omitted.
Figure 7:
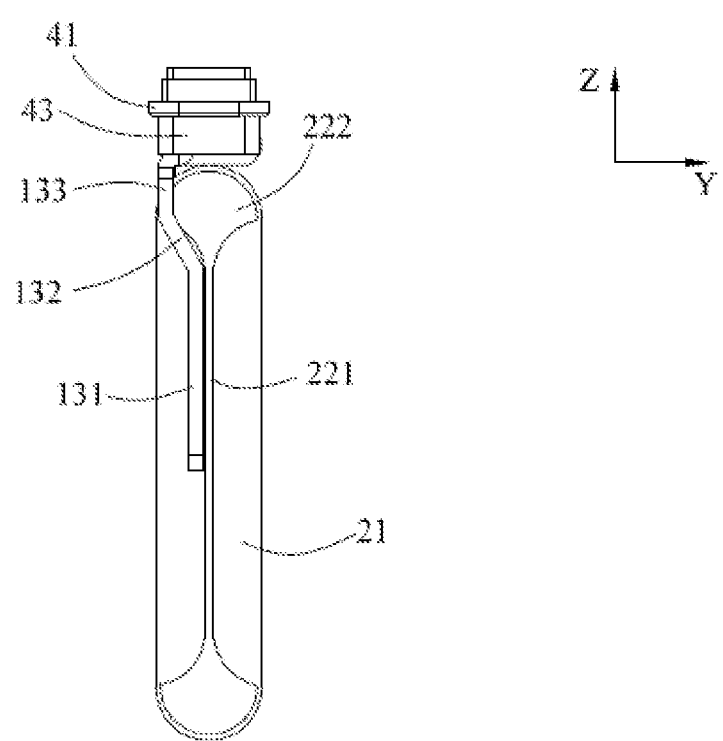
FIG. 7 is a schematic diagram after an electrode assembly and a current collecting member are assembled.

In some embodiments, referring to FIG. 5 to FIG. 7, the tab 22 is arranged on a side of the tab connection part 13 along the width direction Y.

The tab connection part 13 includes a first part 131 and a second part 132, where the first part 131 is perpendicular to the width direction, the second part 132 is connected between the first part 131 and a transition part 12, and the second part 132 is inclined relative to the first part 131 toward a direction away from the tab 22. In a plane perpendicular to the height direction Z, a projection of the first part 131 at least partially overlaps a projection of the transition part 12.

The tab 22 includes a fixing part 221 and a convex part 222, where the fixing part 221 is connected to the first part 131, and the convex part 222 is connected to the fixing part 221 and is located on a side of the fixing part 221 close to the transition part 12. The fixing part 221 may be connected to the first part 131 through welding or the like.

Referring to FIG. 6, the tab 22 is of a multi-layer structure, a plurality of tab layers of the tab 22 are gathered together in a middle region along the height direction Z and is connected to the first part 131, and the gathered middle region forms the fixing part 221. A convex part 222 is formed in an end region of the plurality of tab layers of the tab 22 in the height direction Z.

The end region of the plurality of tab layers of the tab 22 along the height direction Z is not gathered. Therefore, along the width direction Y, a dimension of the convex part 222 is larger than a dimension of the fixing part 221.

The second part 132 is inclined relative to the first part 131 toward a direction away from the tab 22, and therefore the second part 132 can reserve a specific space for the convex part 222 to accommodate the convex part 222 with a larger dimension. In this case, in the height direction Z, a portion of the convex part 222 is located between the second part 132 and the transition part 12.

In some embodiments, the tab connection part 13 further includes a third part 133, where the third part 133 is connected between the second part 132 and the transition part 12, and the third part 133 is perpendicular to the width direction Y. In a plane perpendicular to the width direction Y, a projection of the third part 133 at least partially overlaps a projection of the convex part 222. By providing the third part 133, a degree of inclination of the second part 132 relative to the first part 131 can be increased, and more space is reserved for the convex part 222.

Figure 13:
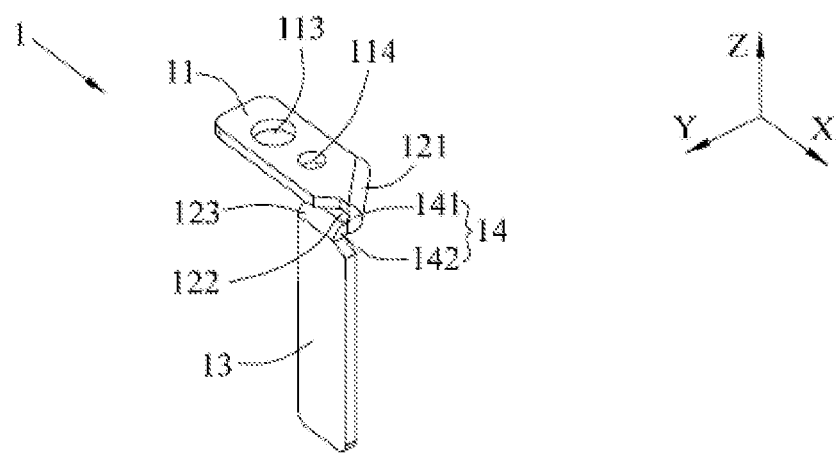
FIG. 13 is a schematic diagram of the plate in FIG. 12 after second bending.

Referring to FIG. 13 and FIG. 8, after the tab connection part 13 of a plate-shaped is formed, by bending the tab connection part 13 twice, the first part 131 that is perpendicular to the adapting part 122, the third part 133 that is parallel to the first part 131 and that is connected to the second bending part 123, and a second part 132 that connects the first part 131 and the third part 133 and that is inclined relative to the first part 131 can be formed.

In some embodiments, referring to FIG. 3 to FIG. 8, the terminal connection part 11 has a first through hole 113 and a second through hole 114, where the first through hole 113 and the second through hole 114 are arranged along the length direction X.

The top cover 41 has a terminal hole, and the first through hole 113 is provided on a lower side of the terminal hole. The electrode terminal 42 has a flange part and an extension part, where the flange part supports the terminal connection part 11 from the lower side, and the extension part extends from the flange part, passes through the first through hole 113 and the terminal hole, and extends outside of the top cover plate.

The top cover assembly 4 further includes a lower insulator 43, where the lower insulator 43 is arranged on the top cover plate 41 and separates the top cover plate 41 from the current collecting member 1. The lower insulator 43 has a protrusion 431, where the protrusion 431 is inserted into the second through hole 114. The protrusion 431 can prevent the current collecting member 1 from rotating along the electrode terminal 42.

Referring to FIG. 11 to FIG. 13, this application also provides a method for manufacturing a current collecting member, including:

providing a metal plate, where the metal plate includes a first long side and a second long side that are arranged oppositely in a width direction Y;

opening a first notch 14 on the first long side of the metal plate;

bending the metal plate in a region in which the first notch 14 is opened, and forming a terminal connection part 11, a flat plate part partially overlapping the terminal connection part 11 along a height direction Z, a first bending part 121 connecting the terminal connection part 11 and the flat plate part, where the first bending part 121 extends along a first direction D inclined relative to a length direction X and the width direction Y;

after bending the metal plate, forming, at the first notch 14, at least a first sub-notch 141 and a second sub-notch 142 that are communicated with each other, where the first sub-notch 141 is opened in a side of the first bending part 121 along the first direction D, and at least a portion of the second sub-notch 142 is opened on a side of the flat plate part along the length direction X; and in a region in which the second sub-notch 142 is opened, bending the flat plate part along the height direction Z, and after the bending, forming an adapting part 122 located on a lower side of the terminal connection part 11 along the height direction Z, a tab connection part 13 perpendicular to the adapting part 122, and a second bending part 123 that is connected between the adapting part 122 and the tab connection part 13 and that is parallel to the length direction X.

In this application, by opening the first notch 14, after the current collecting member 1 is bent and formed, the additional space occupied by the transition part 12 and the tab connection part 13 in the width direction Y can be reduced, the maximum dimension of the current collecting member 1 in the width direction Y can be reduced, and the space occupied by the current collecting member 1 in the housing 3 can be reduced.

The method for manufacturing a current collecting member in this application further includes: opening a second notch 15 on the second long side of the metal plate, where the first notch 14 and the second notch 15 are respectively located on two sides of the metal plate along the width direction Y; after opening the first notch 14 and the second notch 15, bending the metal plate in a region in which the first notch 14 is opened, where after the metal plate is bent and the first bending part 121 is formed, the second notch 15 is at least partially located on a side of the first bending part 121 away from the tab connection part 13 along the first direction.

By opening the second notch 15, the dimension of the first bending part 121 along the first direction D can be reduced, so that an end of the first bending part 121 away from the tab connection part 13 in the first direction D tapers inwards. When the end of the first bending part 121 away from the tab connection part 13 in the first direction D tapers inwards, the additional space occupied by the first bending part 121 in the width direction Y can be reduced.

The method for manufacturing a current collecting member in this application further includes: after the tab connection part 13 is formed, bending the tab connection part 13 to form a first part 131 perpendicular to the adapting part 122, a third part 133 that is parallel to the first part 131 and that is connected to the second bending part 123, and a second part 132 that connects the first part 131 and the third part 133 and that is inclined relative to the first part 131.

The bent tab connection part 13 can reserve a specific space for the convex part 222 to accommodate the convex part 222 with a larger dimension.

This application further provides a method for manufacturing a secondary battery, including:

providing a current collecting member 1 manufactured according to the method for manufacturing a current collecting member;

connecting a terminal connection part 11 of the current collecting member 1 to an electrode terminal 42 of a top cover assembly 4, and connecting a tab connection part 13 of the current collecting member 1 to a tab 22 of an electrode assembly 2; and placing the electrode assembly 2 into a housing 3, and connecting a top cover plate 41 of the top cover assembly 4 and the housing 3 in a sealed manner.

What is claimed is:

1. A current collecting member of a secondary battery, comprising a terminal connection part, a transition part, and a tab connection part, wherein the terminal connection part is perpendicular to a height direction;

the transition part is connected to the terminal connection part and is bent to a side of the terminal connection part along the height direction, a connection between the transition part and the terminal connection part extends along a first direction, and the first direction is inclined relative to a length direction and a width direction;

the tab connection part is connected to the transition part and is bent relative to the transition part, and a connection between the transition part and the tab connection part is parallel to the length direction;

the tab connection part is at least partially perpendicular to the width direction; and along the height direction, the tab connection part is located on a side of the transition part away from the terminal connection part;

wherein the transition part comprises a first bending part, an adapting part, and a second bending part, wherein the adapting part is located on a lower side of the terminal connection part along the height direction, the first bending part is connected between the terminal connection part and the adapting part and is parallel to the first direction, and the second bending part is connected between the tab connection part and the adapting part and is parallel to the length direction.

2. The current collecting member according to claim 1, wherein in the width direction, a first edge and a second edge are oppositely arranged on two ends of the terminal connection part; and in a plane perpendicular to the height direction, along the width direction, a projection of the tab connection part is at least partially located between a projection of the first edge and a projection of the second edge.

3. The current collecting member according to claim 2, wherein in a plane perpendicular to the height direction, along the width direction, a projection of the second bending part is at least partially located between the projection of the first edge and the projection of the second edge;

wherein the adapting part is parallel to the terminal connection part.

4. The current collecting member according to claim 1, wherein the current collecting member has a first notch, the first notch has a first sub-notch and a second sub-notch, and the first sub-notch and the second sub-notch are communicated with each other, wherein the first sub-notch is located on a side of the first bending part close to the tab connection part along the first direction, an included angle between the first direction and the width direction is α, a dimension of the terminal connection part along the width direction is L, and a dimension of the first bending part along the first direction is less than L/cos α;

the second sub-notch is located on a side of the second bending part along the length direction; and along the length direction, a dimension of the tab connection part is larger than a dimension of the second bending part.

5. The current collecting member according to claim 4, wherein the included angle between the first direction and the width direction is 40 degrees to 50 degrees.

6. The current collecting member according to claim 4, wherein the current collecting member further has a second notch, and the second notch is at least partially located on a side of the first bending part away from the tab connection part along the first direction;

wherein a maximum dimension of the terminal connection part in the width direction is a maximum dimension of the current collecting member in the width direction.

7. The current collecting member according to claim 1, wherein a dimension of the terminal connection part in the width direction is a dimension of the tab connection part in the length direction.

8. A secondary battery, comprising a top cover assembly, an electrode assembly, a housing, and a current collecting member, wherein the current collecting member comprises a terminal connection part, a transition part, and a tab connection part, wherein the terminal connection part is perpendicular to a height direction;

the transition part is connected to the terminal connection part and is bent to a side of the terminal connection part along the height direction, a connection between the transition part and the terminal connection part extends along a first direction, and the first direction is inclined relative to a length direction and a width direction;

the tab connection part is connected to the transition part and is bent relative to the transition part, and a connection between the transition part and the tab connection part is parallel to the length direction;

the tab connection part is at least partially perpendicular to the width direction; and along the height direction, the tab connection part is located on a side of the transition part away from the terminal connection part;

the electrode assembly is accommodated in the housing, and the electrode assembly comprises a base part and a tab, wherein the tab extends from an end of the base part in the length direction;

the top cover assembly comprises a top cover plate and an electrode terminal, wherein the top cover plate is connected to the housing, and the electrode terminal is disposed on the top cover plate; and a terminal connection part of the current collecting member is connected to the electrode terminal, and the tab connection part of the current collecting member is connected to the tab;

wherein the transition part comprises a first bending part, an adapting part, and a second bending part, wherein the adapting part is located on a lower side of the terminal connection part along the height direction, the first bending part is connected between the terminal connection part and the adapting part and is parallel to the first direction, and the second bending part is connected between the tab connection part and the adapting part and is parallel to the length direction.

9. The secondary battery according to claim 8, wherein the tab is arranged on a side of the tab connection part along the width direction;

the tab connection part comprises a first part and a second part, wherein the first part is perpendicular to the width direction, the second part is connected between the first part and a transition part, and the second part is inclined relative to the first part toward a direction away from the tab;

in a plane perpendicular to the height direction, a projection of the first part at least partially overlaps a projection of the transition part;

the tab comprises a fixing part and a convex part, wherein the fixing part is connected to the first part, and the convex part is connected to the fixing part and is located on a side of the fixing part close to the transition part; and along the width direction, a dimension of the convex part is larger than a dimension of the fixing part; and in the height direction, a portion of the convex part is located between the second part and the transition part.

10. The secondary battery according to claim 9, wherein the tab connection part comprises a third part, wherein the third part is connected between the second part and the transition part, and the third part is perpendicular to the width direction; and in a plane perpendicular to the width direction, a projection of the third part at least partially overlaps a projection of the convex part.

11. The secondary battery according to claim 8, wherein the terminal connection part has a first through hole and a second through hole, wherein the first through hole and the second through hole are arranged along the length direction;

the electrode terminal passes through the first through hole;

the top cover assembly further comprises a lower insulator, wherein the lower insulator is arranged on the top cover plate and separates the top cover plate from the current collecting member; and the lower insulator has a protrusion, wherein the protrusion is inserted into the second through hole.

12. A battery module, comprising the secondary battery according to claim 8, wherein there are a plurality of secondary batteries.

13. An apparatus, comprising a main body and the secondary battery according to claim 8, wherein there are a plurality of secondary batteries disposed in the main body.

14. The secondary battery according to claim 8, wherein in the width direction, a first edge and a second edge are oppositely arranged on two ends of the terminal connection part; and in a plane perpendicular to the height direction, along the width direction, a projection of the tab connection part is at least partially located between a projection of the first edge and a projection of the second edge.

15. The secondary battery according to claim 14, wherein in a plane perpendicular to the height direction, along the width direction, a projection of the second bending part is at least partially located between the projection of the first edge and the projection of the second edge;

wherein the adapting part is parallel to the terminal connection part.

16. The secondary battery according to claim 8, wherein the current collecting member has a first notch, the first notch has a first sub-notch and a second sub-notch, and the first sub-notch and the second sub-notch are communicated with each other, wherein the first sub-notch is located on a side of the first bending part close to the tab connection part along the first direction, an included angle between the first direction and the width direction is $\alpha$, a dimension of the terminal connection part along the width direction is L, and a dimension of the first bending part along the first direction is less than $L/\cos\alpha$;

the second sub-notch is located on a side of the second bending part along the length direction; and along the length direction, a dimension of the tab connection part is larger than a dimension of the second bending part.

17. The secondary battery according to claim 16, wherein the included angle between the first direction and the width direction is 40 degrees to 50 degrees.

18. The secondary battery according to claim 16, wherein the current collecting member further has a second notch, and the second notch is at least partially located on a side of the first bending part away from the tab connection part along the first direction.

19. The secondary battery according to claim 18, wherein a maximum dimension of the terminal connection part in the width direction is a maximum dimension of the current collecting member in the width direction.

20. The secondary battery according to claim 8, wherein a dimension of the terminal connection part in the width direction is a dimension of the tab connection part in the length direction.

* * * * *